(12) United States Patent
Ishizuka et al.

(10) Patent No.: US 9,093,935 B2
(45) Date of Patent: Jul. 28, 2015

(54) MOTOR CONTROL DEVICE, MOTOR CONTROL METHOD, AND IMAGE FORMING APPARATUS

(71) Applicants: Natsuko Ishizuka, Kanagawa (JP); Takuya Murata, Tokyo (JP); Hiroyuki Kiguchi, Kanagawa (JP); Takeo Seki, Kanagawa (JP)

(72) Inventors: Natsuko Ishizuka, Kanagawa (JP); Takuya Murata, Tokyo (JP); Hiroyuki Kiguchi, Kanagawa (JP); Takeo Seki, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 148 days.

(21) Appl. No.: 13/965,561

(22) Filed: Aug. 13, 2013

(65) Prior Publication Data

US 2014/0049199 A1 Feb. 20, 2014

(30) Foreign Application Priority Data

Aug. 17, 2012 (JP) ................................. 2012-181211

(51) Int. Cl.
*H02P 1/04* (2006.01)
*H02P 6/08* (2006.01)
*H02P 6/00* (2006.01)
*H02P 3/02* (2006.01)
*B41J 19/00* (2006.01)

(52) U.S. Cl.
CPC ........ *H02P 6/08* (2013.01); *H02P 3/025* (2013.01); *H02P 6/003* (2013.01); *B41J 19/00* (2013.01)

(58) Field of Classification Search
CPC .................................. B41J 29/38; H02P 3/05
USPC .......... 318/400.09, 400.36, 400.39, 632, 638, 318/599, 811
See application file for complete search history.

(56) References Cited

U.S. PATENT DOCUMENTS

| 4,982,230 | A | * | 1/1991 | Ogura et al. ..................... 399/35 |
| 7,530,658 | B2 | * | 5/2009 | Igarashi ........................... 347/16 |
| 2004/0212338 | A1 | | 10/2004 | Shimizu et al. |
| 2005/0212472 | A1 | * | 9/2005 | Chapman et al. ............. 318/439 |
| 2012/0306419 | A1 | * | 12/2012 | Suzuki ........................... 318/437 |
| 2013/0200838 | A1 | | 8/2013 | Seki et al. |

FOREIGN PATENT DOCUMENTS

| JP | 2002-347296 | 12/2002 |
| JP | 3924548 | 3/2007 |

* cited by examiner

*Primary Examiner* — Erick Glass
(74) *Attorney, Agent, or Firm* — Oblon, McClelland, Maier & Neustadt, L.L.P.

(57) ABSTRACT

A motor control device supplies a drive control signal to a drive circuit that drives a motor at a constant period using a motor drive signal based on the drive control signal, and shuts off the motor drive signal when a count value counted by a counter that reset the count value if a state of the motor changes exceeds a threshold corresponding to a plurality of driving periods of the motor. The motor control device includes: a control unit that controls a setting unit to set a rotational direction of the motor to a first rotational direction and a second rotational direction reverse to the first rotational direction at the constant period alternately, when a drive mode of the motor is a position holding mode to drive the motor so as to hold a rotational position of the motor.

5 Claims, 8 Drawing Sheets

MOTOR CONTROL DEVICE, MOTOR CONTROL METHOD, AND IMAGE FORMING APPARATUS

CROSS-REFERENCE TO RELATED APPLICATIONS

The present application claims priority to and incorporates by reference the entire contents of Japanese Patent Application No. 2012-181211 filed in Japan on Aug. 17, 2012.

BACKGROUND OF THE INVENTION

1. Field of the Invention

The present invention relates to a motor control device that controls a motor, a motor control method, and an image forming apparatus.

2. Description of the Related Art

Image forming apparatuses such as a printer have been known that form images onto the sheets conveyed by a sheet conveying unit with an image forming unit using the inkjet printing structure or the electrophotography.

Stepping motors have been used as a driving unit for driving the sheet conveying unit. Technologies using a direct current (DC) motor are also widely known in place of technologies using the stepping motors. When using a DC motor, the rotational speed of the DC motor is detected and feedback control is performed so that the detected rotational speed becomes the target speed. In this manner, the sheet conveying unit is driven so that a sheet is conveyed at a predetermined speed.

A typical DC motor has a smaller average power consumption and a larger maximum current than a stepping motor. If an excessive load is applied to the DC motor and the motor enters a lock state (a state in which the DC motor becomes unable to rotate and stops), overcurrent flows through a switching device such as a field-effect transistor (FET) in a control circuit of the DC motor. This may cause damage to the switching device.

In Japanese Patent Application Laid-open No. 2002-347296, a technology is disclosed in which determination is performed whether the DC motor is in the lock state based on a pulse signal for driving the DC motor. Specifically, in the technology disclosed in Japanese Patent Application Laid-open No. 2002-347296, every time the duty of the pulse signal is controlled at constant intervals, determination is performed whether the duty reaches the maximum value. The number of times the duty reaches the maximum value is counted by a counter. Unless the count value of the counter reaches a predetermined value, the DC motor is not stopped although the duty reaches the maximum value and increases the count value of the counter. If the count value of the counter reaches the predetermined value, it is determined that the DC motor is in the lock state, so the voltage application to the DC motor is stopped.

Typical image forming apparatuses include two drive states of the DC motor in the sheet conveying unit: a normal drive state and a position holding state. In the normal drive state, the sheet conveyance speed is controlled to an acceleration speed, a deceleration speed, or a constant speed. In the position holding state, control is performed to hold the rotational position of the DC motor for slacking the sheet during conveyance. That is to say, in the position holding state, the DC motor is driven so that the position of the sheet is held.

There is a problem, however, in that if the control is performed without determining whether the drive state of the DC motor is the normal drive state or the position holding state, the drive state of the DC motor controlled in the position holding state may be detected erroneously as being in the lock state. This stops voltage application to the DC motor although the motor is in the position holding state, whereby the rotational position of the DC motor, that is, the position of the sheet cannot be held.

In view of the above, there is a need to avoid an erroneous detection of a lock state of a motor actually in a position holding state.

SUMMARY OF THE INVENTION

It is an object of the present invention to at least partially solve the problems in the conventional technology.

A motor control device supplies a drive control signal to a drive circuit that drives a motor at a constant period using a motor drive signal based on the drive control signal used to generate torque on the motor, and shuts off the motor drive signal to the motor when a count value counted by a counter that counts the count value at a predetermined interval and resets the count value if a state of the motor changes exceeds a threshold corresponding to the count value for a plurality of driving periods of the motor. The motor control device includes: a setting unit that sets a rotational direction of the motor driven under control at the constant period; a control unit that controls the setting unit to set the rotational direction of the motor to a first rotational direction and a second rotational direction reverse to the first rotational direction at the constant period alternately, when a drive mode of the motor is a position holding mode to drive the motor so as to hold a rotational position of the motor; and a generating unit that generates the drive control signal.

A motor control method of supplying a drive control signal to a drive circuit that drives a motor at a constant period using a motor drive signal based on the drive control signal used to generate torque on the motor, and shuts off the motor drive signal to the motor when a count value counted by a counter that counts the count value at a predetermined interval and resets the count value if the state of the motor changes exceeds a threshold corresponding to the count value for a plurality of driving periods of the motor, the motor control method including: setting a rotational direction of the motor driven under control at the constant period; controlling the setting to set the rotational direction of the motor to a first rotational direction and a second rotational direction reverse to the first rotational direction at the constant period alternately, when a drive mode of the motor is a position holding mode to drive the motor so as to hold a rotational position of the motor; and generating the drive control signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment of a motor control device, a motor control method, and an image forming apparatus in detail with reference to the accompanying drawings.

Structure of Motor Control System according to Embodiment

Figure 1:
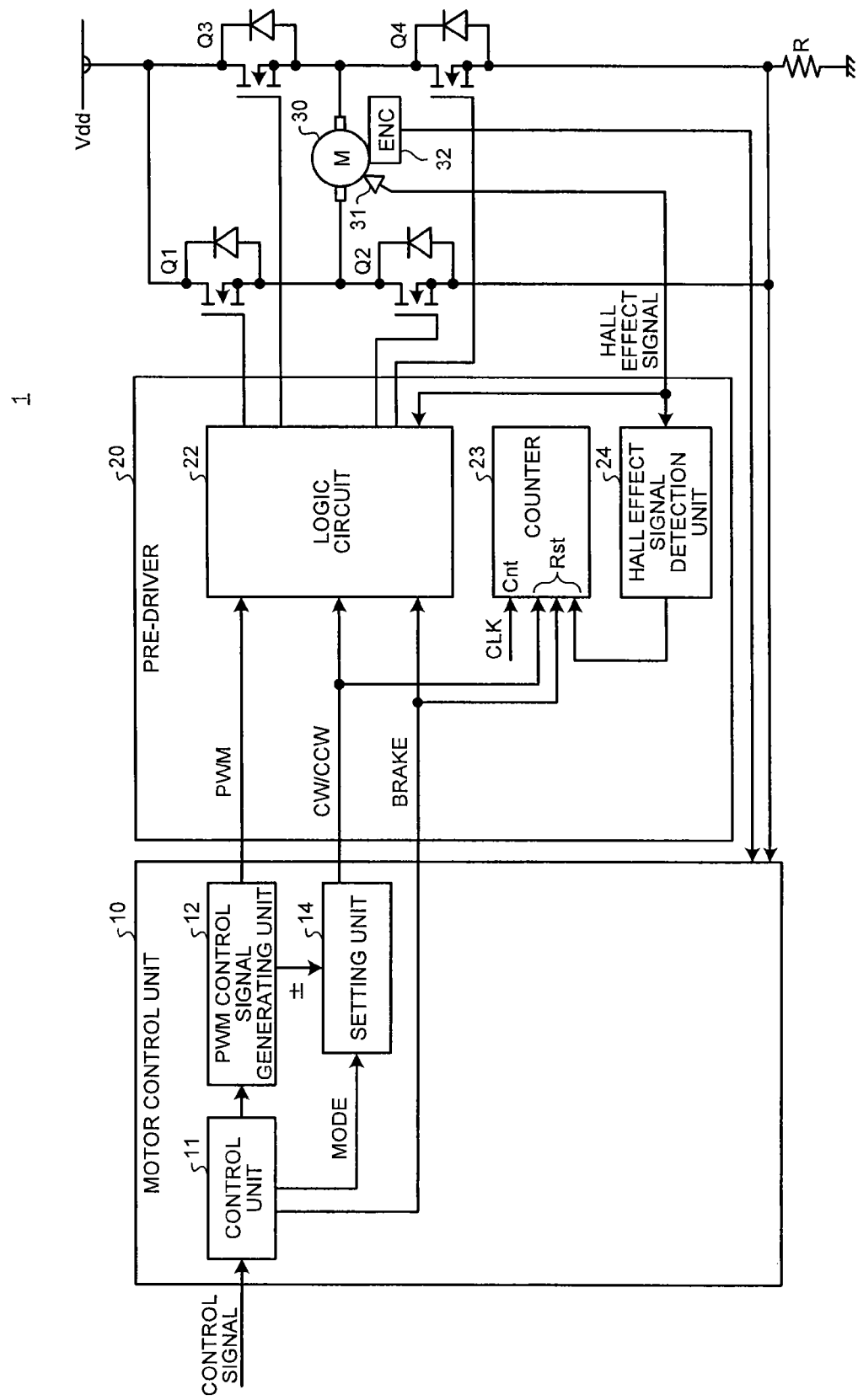
FIG. 1 is an exemplary structural block diagram of a motor control system according to an embodiment.

FIG. 1 illustrates an exemplary structure of a motor control system 1 according to an embodiment. The motor control system 1 according to the embodiment is included in a total control unit (not illustrated) having a controller that totally controls the operation of an apparatus (e.g. an image forming apparatus) to which the motor control system 1 is applied. In the motor control system 1, a pre-driver 20 outputs a motor drive signal based on a drive control signal and an operation control signal generated by a motor control unit 10. The motor drive signal drives a motor 30 to control the rotation of the motor 30.

In the embodiment, the motor 30 is a brushless direct current (DC) motor, and the motor drive signal is a pulse width modulation (PWM) signal. The motor 30, however, is not limited to the brushless direct current DC motor, and a brush motor may be used instead.

The motor control unit 10 includes a control unit 11, a PWM control signal generating unit 12, and a setting unit 14. The control unit 11 receives a control signal for controlling the drive of the motor 30 transmitted from a not-illustrated controller. The control signal includes the target speed, the target position, and the rotational direction of the motor 30, and a startup request or a stop request for the motor 30. The control signal also includes information specifying a normal drive mode (described later) of the motor 30. As the control signal, a pulse signal may be adopted or the control signal may be transferred as table information from the controller to the control unit 11.

An encoder signal is input to the motor control unit 10. The encoder signal is output from an encoder (ENC) 32 (described later) that detects the rotation of the motor 30. The motor control unit 10 performs feedback control based on the control signal received from the controller and the encoder signal input from the encoder 32, and generates a motor drive control signal to be transmitted to the pre-driver 20.

In the motor control unit 10, the control unit 11 generates an instruction signal for instructing the rotational speed and the rotational direction of the motor 30 to the PWM control signal generating unit 12 based on the control signal transmitted from the controller and supplies the instruction signal to the PWM control signal generating unit 12. The instruction signal has an absolute value of a voltage indicating the rotational speed, and a sign (positive and negative) of the polarity indicating the rotational direction.

The PWM control signal generating unit 12 coverts the absolute value of a voltage of the instruction signal supplied from the control unit 11 to a duty ratio and outputs it as a PWM signal. The PWM control signal generating unit 12 supplies a signal indicating the sign of the instruction signal to the setting unit 14. The setting unit 14 generates a clockwise/counterclockwise (CW/CCW) signal for setting the rotational direction of the motor 30 in response to the signal indicating the sign. The setting unit 14, for example, generates a CW/CCW signal for setting a first rotational direction when the sign (polarity) of the instruction signal is positive, and generates a CW/CCW signal for setting a second rotational direction reverse to the first rotational direction when the sign (polarity) of the instruction signal is negative.

The control unit 11 generates a BRAKE signal for performing control to brake the motor 30. The following signals are supplied to the pre-driver 20 as the motor drive control signal for driving the motor 30: the PWM control signal generated in the PWM control signal generating unit 12, the CW/CCW signal generated in the setting unit 14, and the BRAKE signal generated in the control unit 11.

When the motor drive mode included in the control signal received by the control unit 11 indicates a position holding mode, the control unit 11 controls the setting unit 14 to set the rotational direction of the motor 30 and output a CW/CCW signal indicating the set rotational direction.

The pre-driver 20 includes a logic circuit 22, a counter 23, and a Hall effect signal detection unit 24. The PWM signal output from the PWM control signal generating unit 12 of the motor control unit 10 is supplied to the logic circuit 22. The motor 30 is driven at a rotational speed depending on the duty ration of the PWM signal. For example, the motor rotates at the maximum speed at the time when the duty ratio of the PWM signal is 100%, and stops at the time when the duty ratio of the PWM signal is 0%.

The following signals are also supplied to the logic circuit 22: a Hall effect signal output from a Hall effect device 31 provided in the motor 30, and a CW/CCW signal or a BRAKE signal output from the motor control unit 10. The logic circuit 22 generates the motor drive signal for driving the motor 30 based on the following signals: the PWM signal, the Hall effect signal supplied from the Hall effect device 31, and the CW/CCW signal or the BRAKE signal supplied from the motor control unit 10. For example, the logic circuit 22 drives the motor 30 with a three-phase (U, V, and W phases) motor drive signal. The Hall effect signal is also output as a three-phase signal.

The Hall effect signal detection unit 24 detects a change of a Hall effect signal output from the Hall effect device 31.

The counter 23 obtains a count value C by counting a predetermined clock, e.g., an internal clock CLK of the pre-driver 20. The counter 23 resets the count value C in response to the CW/CCW signal or the BRAKE signal. In addition, the counter 23 receives a detection signal indicating that a change of the Hall effect signal is detected, from the Hall effect signal detection unit 24, thereby resetting the count value C.

The counter 23 compares the count value C to a threshold $C_{th}$. If the count value C exceeds the threshold $C_{th}$, the counter 23 determines that the motor 30 has entered the lock state, and then outputs a lock state detection signal indicating that the motor 30 is in the lock state, to the logic circuit 22. When the logic circuit 22 receives the lock state detection signal, the logic circuit 22 shuts off the supply of the motor drive signal for driving the motor 30, for example, thereby protecting the motor 30 or a driver circuit.

The motor 30 is driven by a driver circuit including an H-bridge circuit with switching devices Q1 to Q4 using a field-effect transistor (FET), for example. In FIG. 1, a two-phase H-bridge circuit is illustrated as an example of the driver circuit, for description. If the motor 30 is driven by a three-phase circuit, actually, a further pair of upper and lower switching devices is added to the motor 30.

Each three-phase (U, V, and W phases) motor drive signal output from the logic circuit 22 is supplied to each gate of the switching devices Q1 to Q4, and a motor drive voltage Vdd is supplied to the driver circuit. Each of the three-phase (U, V, and W phases) motor drive signals controls the switching devices Q1 to Q4 at a predetermined timing, whereby the motor 30 is driven to rotate.

The logic circuit 22 changes the order of the three-phase motor drive signal and the three-phase Hall effect signal depending on the CW/CCW signal, thereby controlling the rotational direction of the motor 30 to be the first rotational direction or the second rotational direction. The logic circuit 22 shorts terminals of the motor 30, for example, depending on the BRAKE signal, thereby braking the motor 30 until it stops.

The Hall effect device 31 is embedded in the motor 30 and outputs an analog signal corresponding to the intensity of the magnetic field in the motor 30. The Hall effect signal output from the Hall effect device 31 is processed through predetermined signal processing such as amplification in a not-illustrated signal processing circuit, and then supplied to the Hall effect signal detection unit 24 and the logic circuit 22.

The encoder 32 is provided on the shaft of the motor 30, for example, and outputs a two-phase (A and B phases) encoder signal depending on the rotation of the motor 30. The encoder signal is supplied to the motor control unit 10. In the motor control unit 10, the control unit 11 can monitor an amount of rotation, the rotational speed, and the rotational direction of the motor 30 based on the received encoder signal, for example.

The encoder 32 may be provided at a portion that moves in synchronization with the control target driven under control of the motor 30, for example, rather than the shaft of the motor 30. In addition, the rotational speed of the motor 30 may be detected using the Hall effect signal output by the Hall effect device 31 instead of the encoder signal output by the encoder 32. In this case, the encoder 32 as a sensor for detecting the speed can be omitted, whereby the cost of the system can be reduced.

A resistor R is a shunt resistor for monitoring a composite current flowing through the motor 30 using the motor control unit 10. The current output monitored by the resistor R is supplied to the motor control unit 10.

Drive Modes of Motor

The following describes drive modes of the motor 30 in the motor control system 1 according to the embodiment. In the embodiment, the motor control system 1 includes the following three drive modes: a normal drive mode in which the motor 30 is driven to a normal state (1), a position holding mode in which the motor 30 is driven to a position holding state (2), and a stop mode in which the motor 30 is brought into a stopped state (3). Information indicating the motor drive mode is included in the control signal, for example, and supplied from the controller to the motor control unit 10.

In the normal drive mode (1), the motor control system 1 drives the motor 30 to rotate according to the rotational speed and rotational direction specified by the control signal from the not-illustrated controller. The motor 30 is driven to rotate in the normal drive mode so that the rotational position of the motor 30 continuously changes.

In the position holding mode (2), the motor control system 1 drives the motor 30 to rotate so that the rotational position of the motor 30 is held. This state in which the rotational position of the motor 30 is held is called the position holding state. In the position holding mode, the motor control unit 10 controls drive of the motor 30 to supply a motor drive signal for generating such torque that the motor 30 does not start rotating, to the motor 30. More specifically, the motor control unit 10 generates a PWM control signal according to which the drive signal output from the pre-driver 20 to the motor 30 controls drive of the motor 30 so as to hold the rotational position of the motor 30.

When the motor control system 1 is used for driving a conveying system of an image forming apparatus, for example, the motor control system 1 needs to control drive of the motor 30 to hold the rotational position of the motor 30 in order to slack a sheet that is being conveyed, as described above. In such an example, the motor 30 is driven in the position holding mode.

Figure 2:
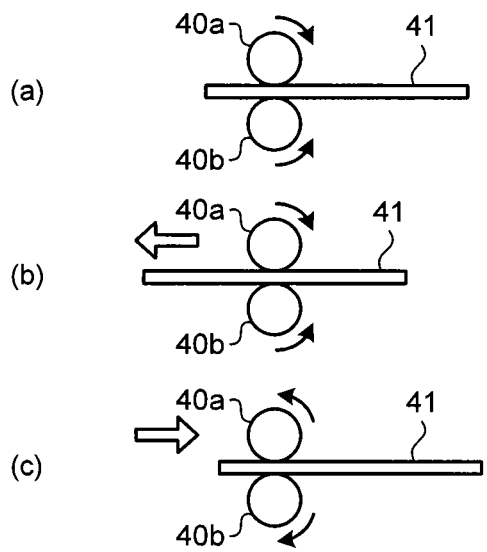
FIG. 2 is a diagram for explaining a position holding state.

The outline of the position holding state will now be described with reference to FIG. 2. The following describes control to drive a registration roller that is used for the positioning of a sheet in an image forming apparatus. As illustrated in FIGS. 2(a) to 2(c), the position of a sheet 41 is controlled by a pair of registration rollers 40a and 40b for the positioning of the sheet. The motor 30 drives to rotate at least one of the registration rollers 40a and 40b. In the example described here, the motor 30 drives to rotate the registration roller 40a.

In the position holding mode, the motor control unit 10 outputs a predetermined PWM control signal for driving the motor 30 so as to hold its rotational position, to the pre-driver 20. This generates torque in a direction for rotating the registration roller 40a counterclockwise in FIG. 2, for example, at such a level that the registration roller 40a actually does not rotate.

An example will now be described in which, in this state, disturbance caused by a force in a direction (clockwise direction) reverse to the driving direction of the registration roller 40a was applied to the sheet 41, the motor 30, and the registration rollers 40a and 40b, and moved the sheet 41 to the left, and the position of the sheet 41 has changed as illustrated in FIG. 2(b). In the position holding mode, the motor 30 is driven in the position holding state, and positional error correction control (described later) can be performed for controlling the drive of the motor 30 thereby returning the position of the sheet 41 to the original position as illustrated in FIG. 2(c).

Figure 3:
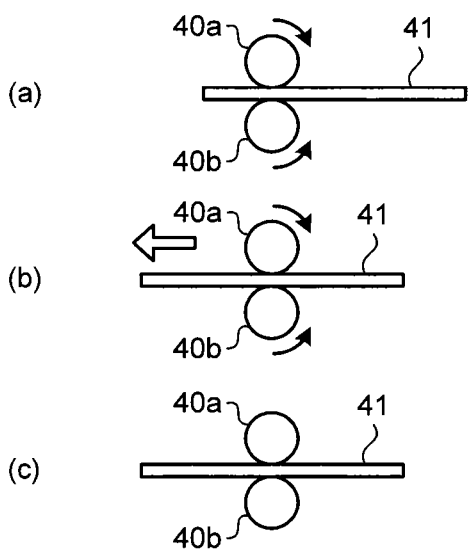
FIG. 3 is a diagram for explaining a stopped state of the motor control system according to the embodiment.

In the stop mode (3), no PWM control signal is output from the motor control unit 10 to the pre-driver 20, so that the motor 30 enters a non-controlled state. The outline of the stop mode will now be described with reference to FIGS. 3(a) to 3(c). If the disturbance that moves the sheet to the left is applied in the same manner as described above (FIG. 3(a)), positional control is not performed on the sheet 41 because no torque is generated in the motor 30 and the sheet 41 thus moves in response to the disturbance (FIG. 3(b)). The sheet 41, therefore, moves to a position that differs from the original position, as illustrated in FIG. 3(c).

In the position holding state described above, the position of the sheet 41 is held regardless of the disturbance, thus the position holding state is different from the stopped state. The stopped state may be achieved by supplying the BRAKE signal to the logic circuit 22, rather than by stopping supplying the PWM control signal from the motor control unit 10 to the pre-driver 20.

Erroneous Detection of Lock State in Position Holding State

The following describes an erroneous detection of the lock state in the position holding state. As described above, the motor control system 1 according to the embodiment obtains the count value C using the counter 23 in the pre-driver 20 and monitors the Hall effect signal output from the Hall effect device 31 and various control signals (the CW/CCW signal and the BRAKE signal) output from the motor control unit 10. The motor control system 1 resets the count value C every time a change of the signals is detected. If the count value C becomes equal to or larger than the threshold $C_{th}$, the supply of the motor drive signal to the motor 30 is shut off. In other words, the count value C continues to increase unless a change of the signals is detected.

Figure 4:
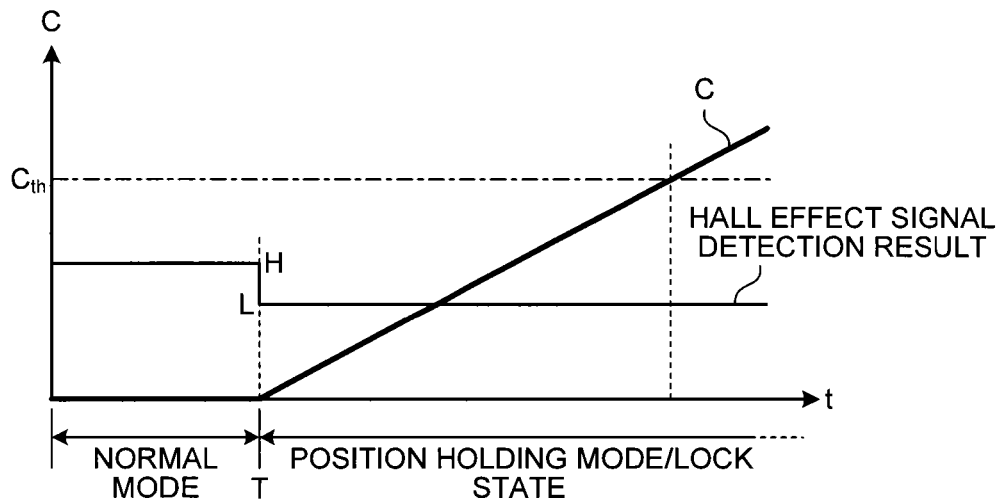
FIG. 4 is a diagram for explaining that the position holding state is erroneously detected as a lock state.

The following describes that the position holding state is detected in error as the lock state with reference to FIG. 4. In this example, for convenience of description, the Hall effect signal detection unit 24 outputs a signal at a high level in a period in which the Hall effect signal changes; and a signal at a low level in a period in which the Hall effect signal does not change. The CW/CCW signal and the BRAKE signal are not considered and a change of the Hall effect signal only is focused on for description in this example.

When the motor 30 is rotated in the normal drive mode, the motor 30 rotates and the Hall effect signal changes. The counter 23 is thus always in a reset state; therefore, the count value C does not increase.

The Hall effect signal stops changing at a time T, and the low level signal is output from the Hall effect signal detection unit 24. As long as the Hall effect signal does not change, the counter 23 is not reset and the count value C continues to increase. At the time point when the count value C reaches the threshold $C_{th}$, the counter 23 outputs a lock state detection signal and shuts off the electrical power to the motor 30. For example, the counter 23 outputs the lock state detection signal to the logic circuit 22, and the logic circuit 22 shuts off the supply of the motor drive signal to the motor 30 in response to the lock state detection signal.

No change of the Hall effect signal means that the motor 30 does not rotate. When the drive mode of the motor 30 is the normal drive mode and if the rotation of the motor 30 is inhibited by the disturbance, for example, the motor 30 enters a state in which the motor 30 does not rotate although the motor drive signal is supplied. The count value C therefore continues to increase and this may damage the driver circuit that drives the motor 30, or the like, due to the overload. To avoid this, the motor control system 1 detects this state as the lock state and shuts off the motor drive signal to the motor 30, thereby protecting the motor 30 and the driver circuit.

In the position holding mode, the motor 30 is in the position holding state in which the rotational position is held although the drive signal is supplied. Therefore, if no disturbance occurs and the rotational position does not change, no change appears in the Hall effect signal. As a result, while the motor 30 is in the position holding state, the count value C continues to increase and the position holding state is detected as the lock state.

The detection of the lock state is not limited to the method using the Hall effect signal output by the Hall effect device 31. The lock state may be detected by monitoring the output from the encoder 32, in the motor control unit 10.

Response to Erroneous Detection of Lock State in Related Art

The following describes the outline of the technologies in the related art for avoiding the erroneous detection of the lock state in the position holding state. In the related art, when the motor 30 is usually driven in the normal drive mode, the lock state is detected based on the count value C of the counter 23, thereby preventing damage of the driver circuit due to the overload as described above. By contrast, when the drive mode of the motor 30 is the position holding mode, the lock state is disabled for avoiding the erroneous detection, thereby making it possible to hold the rotational position of the motor 30 while driving the motor 30.

Figure 5:
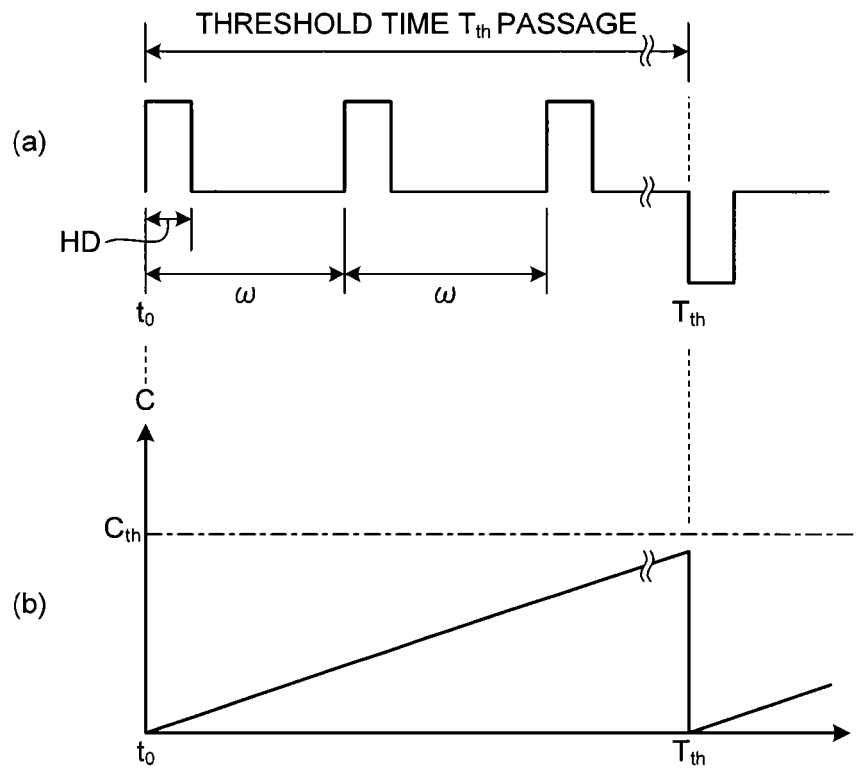
FIG. 5 is a diagram for explaining a method for avoiding the detection of the lock state according to a related technology.

The following describes the avoidance operation for the lock state detection in the related art with reference to FIG. 5. FIG. 5(a) schematically illustrates the PWM control signal for driving the motor 30 in the state in which the PWM control signal is converted into, the PWM signal. FIG. 5(b) illustrates the count value C of the counter 23. In FIG. 5(a), an upward pulse indicates a signal for driving the motor 30 in a forward direction; a downward pulse indicates a signal for driving the motor 30 in a reverse direction, that is, in the rotational direction reverse to the forward direction.

In the position holding mode, the duty ratio of the PWM signal for holding the rotational position of the motor 30 is 25%, the motor control unit 10 outputs a PWM control signal for generating a PWM signal with a duty ratio of 25% for each driving period ω of the motor 30. The motor control unit 10 reverses the sign (polarity) of the instruction signal specifying the rotational direction of the motor 30, before a threshold time $T_{th}$ elapses.

The duty ratio of the PWM signal for holding the rotational position of the motor 30 is hereinafter called a rotational position holding duty ratio HD.

The control unit 11 in the motor control unit 10 generates an instruction signal instructing generation of a PWM signal with the rotational position holding duty ratio HD and a predetermined rotational direction, and supplies the instruction signal to the PWM control signal generating unit 12. The PWM control signal generating unit 12 generates a PWM control signal corresponding to the rotational position holding duty ratio HD based on the instruction signal, and supplies the PWM control signal to the pre-driver 20. The PWM control signal generating unit 12 retrieves information indicating the sign, from the instruction signal, and supplies the information to the setting unit 14. The setting unit 14 generates a CW/CCW signal specifying a forward rotational direction, for example, based on the retrieved information indicating the sign, and supplies the CW/CCW signal to the pre-driver 20 (FIG. 5(a)). While the motor 30 is driven in the forward rotational direction by the PWM signal with the rotational position holding duty ratio HD, the rotational position of the motor 30 is held, whereby the count value C of the counter 23 continues to increase as illustrated in FIG. 5(b). As the threshold time $T_{th}$, the time immediately before the count value C reaches the threshold $C_{th}$ is set in advance in the motor control unit 10, for example.

When the threshold time $T_{th}$ is reached, the motor control unit 10 outputs such a CW/CCW signal to the pre-driver 20 that the rotational direction of the motor 30 is reversed, to set the reversed rotational direction, and the motor 30 is driven in the reversed rotational direction with the rotational position holding duty ratio HD. By inputting the CW/CCW signal to the pre-driver 20, the count value C is reset in the counter 23. After the motor control unit 10 has driven the motor 30 in the reversed rotational direction for one period, for example, the motor control unit 10 outputs a CW/CCW signal to the pre-driver 20 again, thereby returning the output polarity to the original polarity.

Through the control described above, the count value C of the counter 23 will not reach the threshold $C_{th}$, whereby an erroneous detection of the lock state in the position holding state can be avoided. In the technologies in the related art, however, the setting of the threshold time $T_{th}$ needs to be adjusted for each product of motor 30 because it differs between products of the motor 30, which is troublesome.

Avoidance of Erroneous Detection of Lock State according to Embodiment

Figure 6:
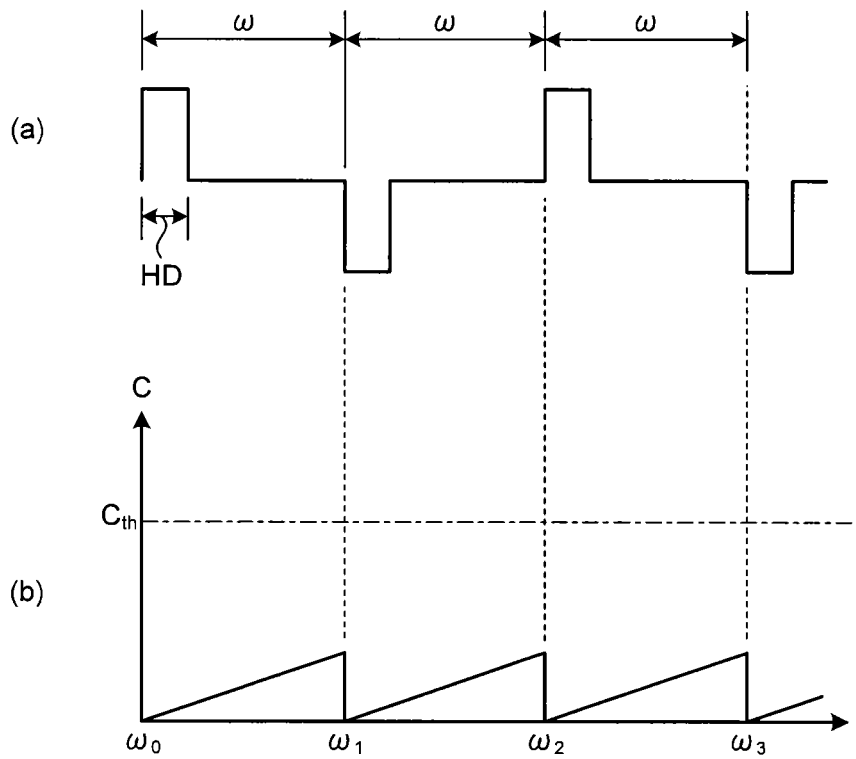
FIG. 6 is a diagram for explaining a method for avoiding the detection of the lock state according to the embodiment.

The following describes avoidance of the erroneous detection of the lock state according to the embodiment. In the embodiment, in the position holding mode, the rotational direction of the motor 30 is reversed for each constant period, for example, for each driving period ω of the motor 30. The following describes the avoidance operation for the lock state detection according to the embodiment with reference to FIG. 6. FIG. 6(a) schematically illustrates a PWM control signal for driving the motor 30 in the state in which the PWM control signal is converted into the PWM signal. FIG. 6(b) illustrates the count value C of the counter 23. In FIG. 6(a), an upward pulse indicates a signal for driving the motor 30 in a forward direction; a downward pulse indicates a signal for driving the motor 30 in a reverse direction.

As illustrated in FIG. 6(a), in the position holding mode, the PWM control signal generating unit 12 generates a PWM control signal corresponding to the rotational position holding duty ratio HD for each driving period ω of the motor 30, and supplies the PWM control signal to the pre-driver 20. In addition, the setting unit 14 outputs a CW/CCW signal for alternately reversing the rotational direction of the motor 30 based on the control by the control unit 11 for each driving period ω of the motor 30 and supplies the CW/CCW signal to the pre-driver 20.

In the example illustrated in FIG. 6(a), the motor control unit 10 instructs the rotation in the forward direction by the CW/CCW signal at a driving period $ω_0$, and the rotation in the reverse direction by the CW/CCW signal at the subsequent driving period $ω_1$. Subsequently, the motor control unit 10 instructs the rotation in the forward direction by the CW/CCW signal at a driving period $ω_2$.

It is preferable that the lock state is detected over a plurality of driving periods ω of the motor 30. Therefore, a value which the count value C reaches after a plurality of driving periods ω of the motor 30 is used as the threshold $C_{th}$. As a result, the count value C does not reach the threshold $C_{th}$ even if the motor 30 is driven in the position holding state, as illustrated in FIG. 6(b). This prevents the motor 30 being in the position holding state from being erroneously detected as in the lock state.

Figure 7:
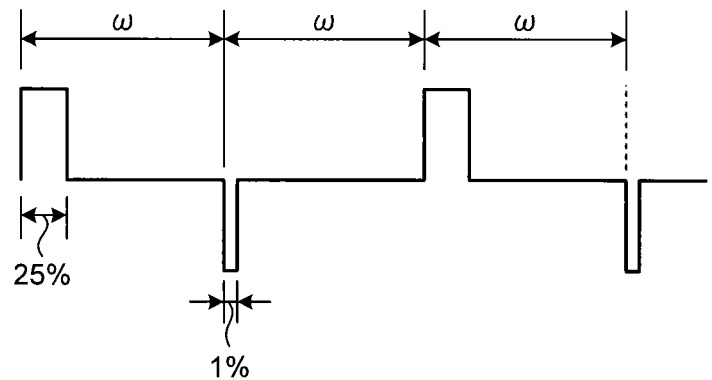
FIG. 7 is a diagram for illustrating another method for avoiding the detection of the lock state according to the embodiment.

When the motor control unit 10 instructs the rotation in the reverse direction, the duty ratio of the PWM signal is preferably set smaller than the rotational position holding duty ratio HD for reasons including that vibration during a reverse operation is suppressed. FIG. 7 illustrates an example in which the duty ratio of the PWM signal is set to 1% when the output polarity corresponds to the reverse operation while the rotational position holding duty ratio HD is 25%. The duty ratio of the PWM signal when the output polarity corresponds to the reverse operation is preferably set as small as possible.

Operation of the Motor Control Unit according to the Embodiment

Figure 8:
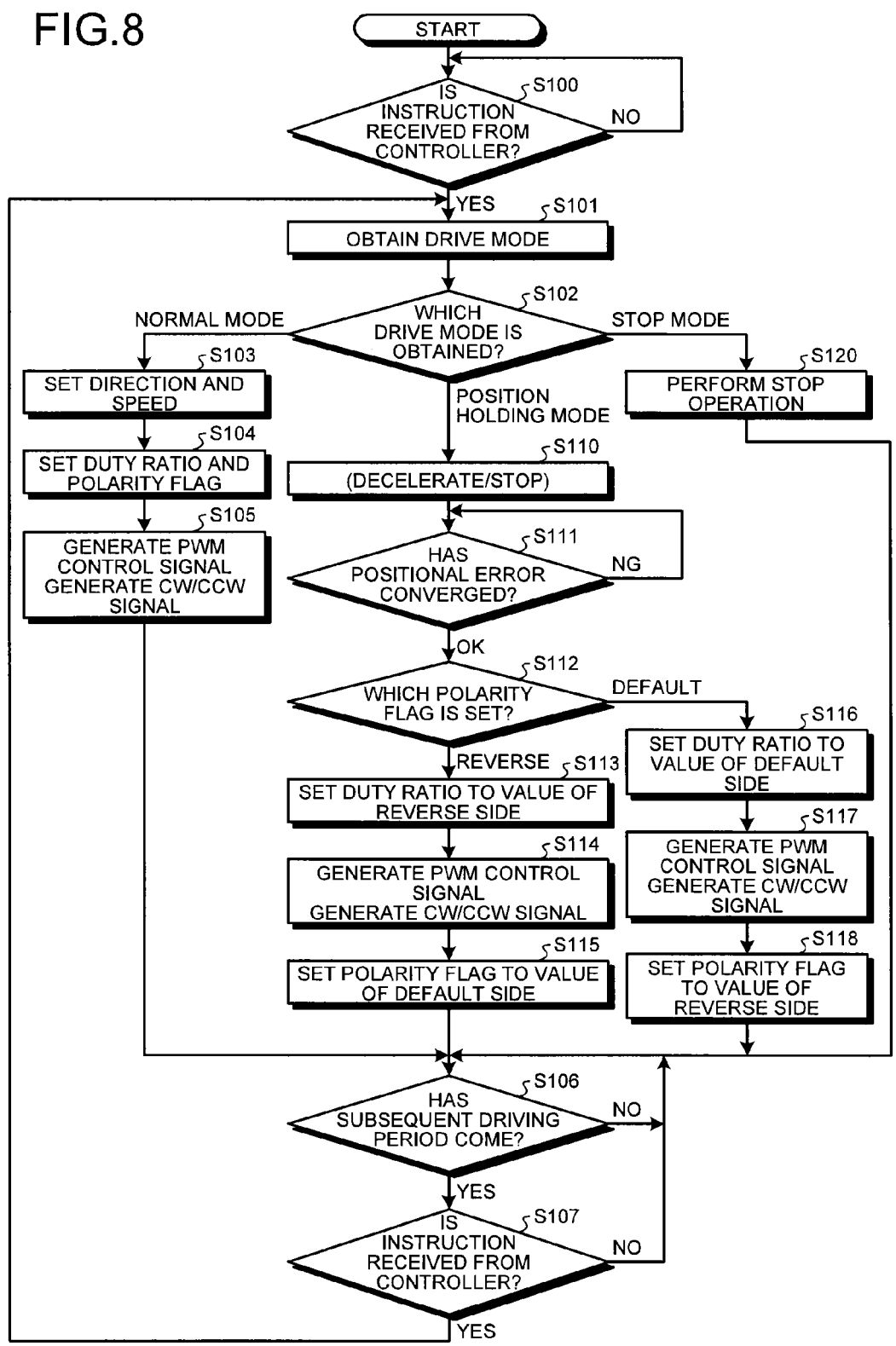
FIG. 8 is a flowchart for explaining an example of the operation of a motor control unit according to the embodiment.

The following describes the exemplary operation of the motor control unit 10 according to the embodiment with reference to the flowchart illustrated in FIG. 8. The motor control unit 10 sets the polarity flag (described later) to the value corresponding to the default rotational direction in advance before performing operation in the flowchart illustrated in FIG. 8. The default rotational direction is, for example, the rotational direction of the motor 30 when driving the drive target of the motor 30 in a predetermined direction.

At Step S100, the motor control unit 10 waits for an instruction from the controller. After receiving a control signal including the instruction from the controller, the motor control unit 10 obtains the drive mode of the motor 30 from the control signal at Step S101. Here, it is assumed that three drive modes are defined: the normal drive mode, the position holding mode, and the stop mode.

At Step S102, the motor control unit 10 determines whether the obtained drive mode is the normal drive mode, the position holding mode, or the stop mode. If the motor control unit 10 determines that the drive mode is the normal drive mode, the processing proceeds to Step S103.

At Step S103, the motor control unit 10 sets information of the rotational direction and the rotational speed included in the control signal received from the controller. At the subsequent Step S104, the motor control unit 10 sets the duty ratio of the PWM signal for driving the motor 30 based on the rotational direction and the rotational speed set at Step S103, and a value of the polarity flag corresponding to the rotational direction. The value of the polarity flag is set to the setting unit 14, for example. At the subsequent Step S105, the motor control unit 10 generates a PWM control signal and a CW/CCW signal according to the duty ratio and the polarity flag set at Step S104, and transmits the PWM control signal and the CW/CCW signal to the pre-driver 20.

After finishing transmitting the signals to the pre-driver 20 at Step S105, the processing proceeds to Step S106 and the motor control unit 10 waits for the subsequent driving period of the motor 30. When the subsequent driving period of the motor 30 comes, the processing proceeds to Step S107, and the motor control unit 10 determines the presence of an instruction from the controller. If the motor control unit 10 determines that no control signal is received from the controller, the processing returns to Step S106, and the motor control unit 10 waits for the subsequent driving period of the motor. If the motor control unit 10 determines that a control signal is received from the controller, the processing returns to Step S101.

At Step S102 described above, if the motor control unit 10 determines that the drive mode is the position holding mode, the processing proceeds to Step S110. At Step S110, when the immediately preceding drive mode is the normal drive mode, for example, and the motor 30 is rotated, the motor control unit 10 decelerates the motor 30 until it stops. For example, the motor control unit 10 generates a PWM control signal for decelerating the rotational speed of the motor 30 and stopping the motor 30. The motor 30 may also be stopped by a BRAKE signal.

Figure 9:
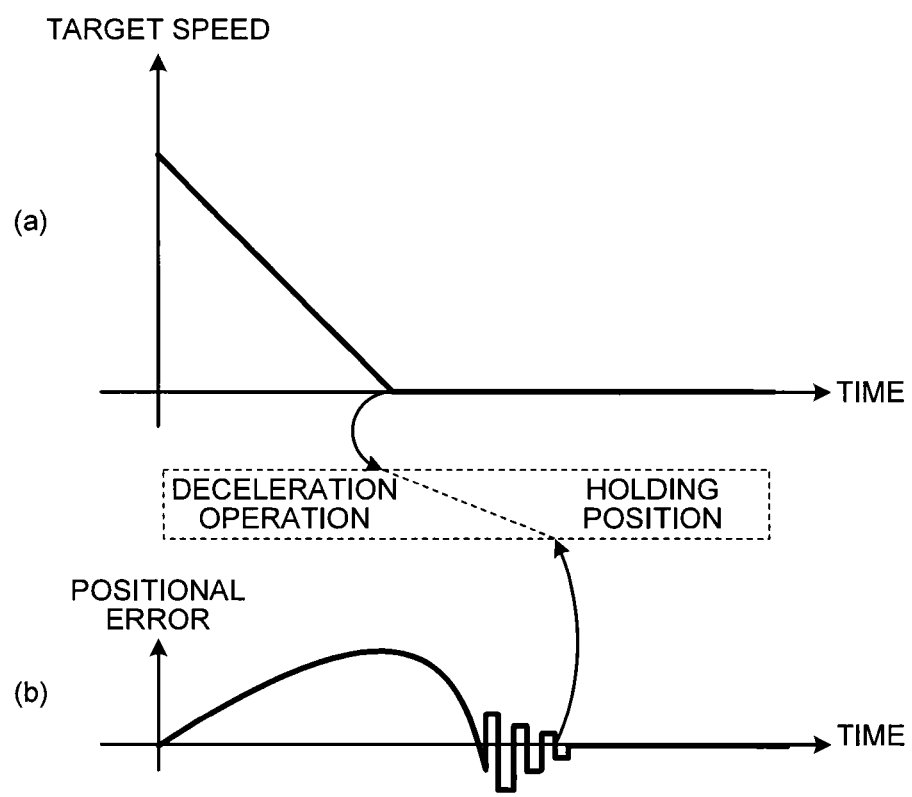
FIG. 9 is a diagram for explaining a positional error when a motor is stopped.

At the subsequent Step S111, the motor control unit 10 waits until the positional error associated with the stop of the motor 30 converges within a predetermined range. The following describes the convergence of the positional error associated with the stop of the motor 30 with reference to FIG. 9. FIG. 9(a) illustrates an exemplary relation between time and target speeds when the motor 30 is controlled to be decelerated and stopped. Below FIG. 9(a), a driving state of the motor 30 (a deceleration operation and the position holding state) is illustrated in association with the time axis of FIG. 9(a). FIG. 9(b) illustrates an example of the relation between time and a positional error.

The stop position of a sheet is important in sheet conveyance in an image forming apparatus, for example. The sheet may not be able to reach the target stop position depending on the speed during the deceleration of the motor 30 or a state of a load on the motor 30, at the time point when the deceleration operation with a given deceleration speed ends.

For this reason, the motor control unit 10 performs positional error correction control of a motor stop position. The positional error correction control is performed by repeatedly rotating the motor 30 in a forward direction and a reverse direction, as illustrated in FIG. 9(b). When the positional error has converged within a predetermined range, the controller notifies the motor control unit 10 thereof, for example. When the drive state of the motor 30 is the position holding state and the positional error occurs due to the disturbance as described with reference to FIGS. 2(b) and 2(c), the same positional error correction control is performed.

At Step S111, if the motor control unit 10 determines that the positional error has converged within a predetermined range, the processing proceeds to Step S112 and the motor control unit 10 determines whether the polarity flag is set to a value indicating the default side or the reverse side. If the motor control unit 10 determines that the polarity flag is set to the value indicating the reverse side, the processing proceeds to Step S113.

At Step S113, the motor control unit 10 sets the duty ratio of the PWM signal for driving the motor 30 to a value predetermined for a PWM signal when the rotational direction of the motor 30 is reversed. For example, as described above with reference to FIG. 7, when the duty ratio of the PWM signal on the default side, that is, in the case when the rotational direction is not reversed (i.e. the rotational position holding duty ratio HD), is 25%, the duty ratio is set to a value smaller than 25% (e.g. 1%).

At the subsequent Step S114, the motor control unit 10 generates a PWM control signal based on the duty ratio set at Step S113, and a CW/CCW signal indicating the reverse rotational direction based on the polarity flag. The motor control unit 10 transmits the generated PWM control signal and CW/CCW signal to the pre-driver 20. At the subsequent Step S115, the motor control unit 10 sets the polarity flag to the default side and the processing proceeds to the above-described Step S106.

If the motor control unit 10 determines that the polarity flag is set to the value indicating the default side, the processing proceeds to Step S116.

At Step S116, the motor control unit 10 sets the duty ratio of the PWM signal for driving the motor 30, to a value (the rotational position holding duty ratio HD) predetermined for the PWM signal on the default side.

At the subsequent Step S117, the motor control unit 10 generates a PWM control signal based on the duty ratio set at Step S116, and a CW/CCW signal indicating the default rotational direction based on the polarity flag. The motor control unit 10 transmits the generated PWM control signal and the CW/CCW signal to the pre-driver 20. At the subsequent Step S118, the motor control unit 10 sets the polarity flag to the reverse side and the processing proceeds to the above-described Step S106.

If the motor control unit 10 determines that the drive mode is the stop mode at Step S102 described above, the processing proceeds to Step S120. The motor control unit 10 performs a stop operation of the motor 30 at Step S120, and the processing proceeds to Step S106 described above.

Operation of the Pre-driver according to the Embodiment

Figure 10:
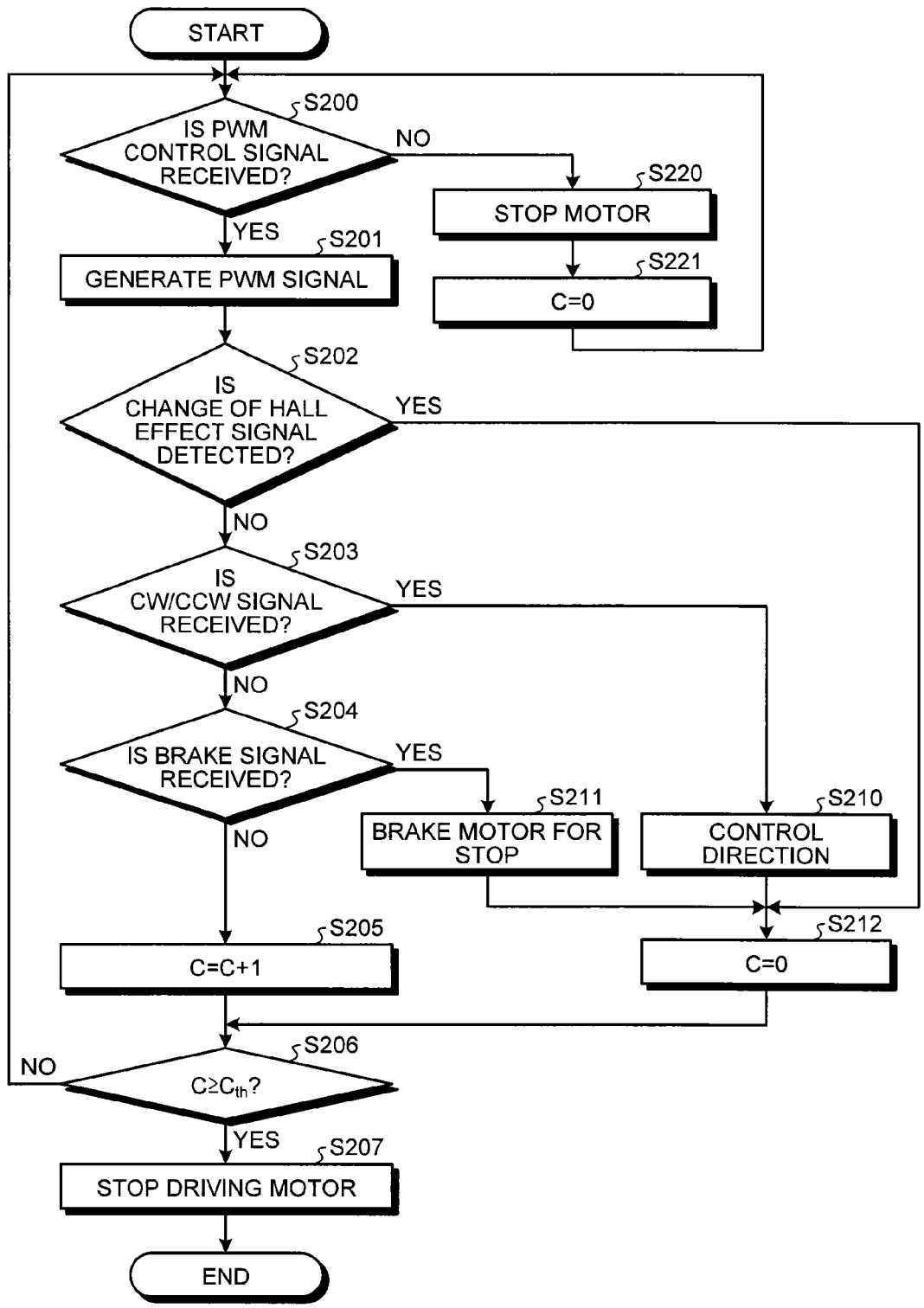
FIG. 10 is a flowchart for illustrating an example of the operation of a pre-driver according to the embodiment.

The following describes the exemplary operation of the pre-driver 20 according to the embodiment with reference to the flowchart illustrated in FIG. 10. At Step S200, the pre-driver 20 determines whether the PWM control signal is received from the motor control unit 10. If the pre-driver 20 determines that the PWM control signal is not received, the pre-driver 20 drives the motor 30 to the stopped state at the subsequent Step S220, and resets the count value C of the counter 23 to 0 at Step S221. The processing then returns to Step S200.

If the pre-driver 20 determines that the PWM control signal is received at Step S200, the processing proceeds to the subsequent Step S201. At Step S201, the pre-driver 20 generates a PWM signal based on the PWM control signal received from the motor control unit 10.

At the subsequent Step S202, the pre-driver 20 determines whether a change of the Hall effect signal is detected based on a detection output of the Hall effect signal detection unit 24. If the pre-driver 20 determines that a change of the Hall effect signal is detected, the processing proceeds to Step S212, and the count value C of the counter 23 is reset to 0. After the count value is reset to 0 at Step S212, the processing proceeds to Step S206 described later. If the pre-driver 20 determines that no change of the Hall effect signal is detected, the processing proceeds to Step S203.

At Step S203, the pre-driver 20 determines whether a CW/CCW signal is received from the motor control unit 10. If the pre-driver 20 determines that the CW/CCW signal is received, the processing proceeds to Step S210, and the logic circuit 22 controls the rotational direction of the motor 30 based on the received CW/CCW signal. The processing then proceeds to Step S212, and the count value of the counter 23 is reset to 0. If the pre-driver 20 determines that no CW/CCW signal is received at Step S203, the processing proceeds to Step S204.

At Step S204, the pre-driver 20 determines whether a BRAKE signal is received from the motor control unit 10. If the pre-driver 20 determines that a BRAKE signal is received, the processing proceeds to Step S211, and the logic circuit 22 performs control to brake the motor 30 until it stops. The processing then proceeds to Step S212, and the count value of the counter 23 is reset to 0. If the pre-driver 20 determines that no BRAKE signal is received, the processing proceeds to Step S205.

At Step S205, the count value C is increased by one in the counter 23. The processing then proceeds to Step S206, and the pre-driver 20 determines whether the count value C of the counter 23 is equal to or larger than the threshold $C_{th}$. If the pre-driver 20 determines that the count value C is smaller the threshold $C_{th}$, the processing returns to Step S200.

If the pre-driver 20 determines that the count value C is equal to or larger than the threshold $C_{th}$, the processing proceeds to Step S207, and driving of the motor 30 is stopped. Specifically, in the pre-driver 20, the motor drive signal supplied from the logic circuit 22 to the motor 30 is shut off, for example. Driving the motor 30 may be stopped by stopping the generation of the PWM signal based on the PWM control signal.

As described above, according to the embodiment, when the motor is driven in the position holding state, an instruction is issued to reverse the rotational direction of the motor for each driving period of the motor, so that the count value for counting detection of the lock state is reset for each driving period of the motor. As a result, the count value does not exceed the threshold in the position holding state, thereby making it possible to prevent the position holding state from being erroneously detected as the lock state.

Application to Image Forming Apparatus

Figure 11:
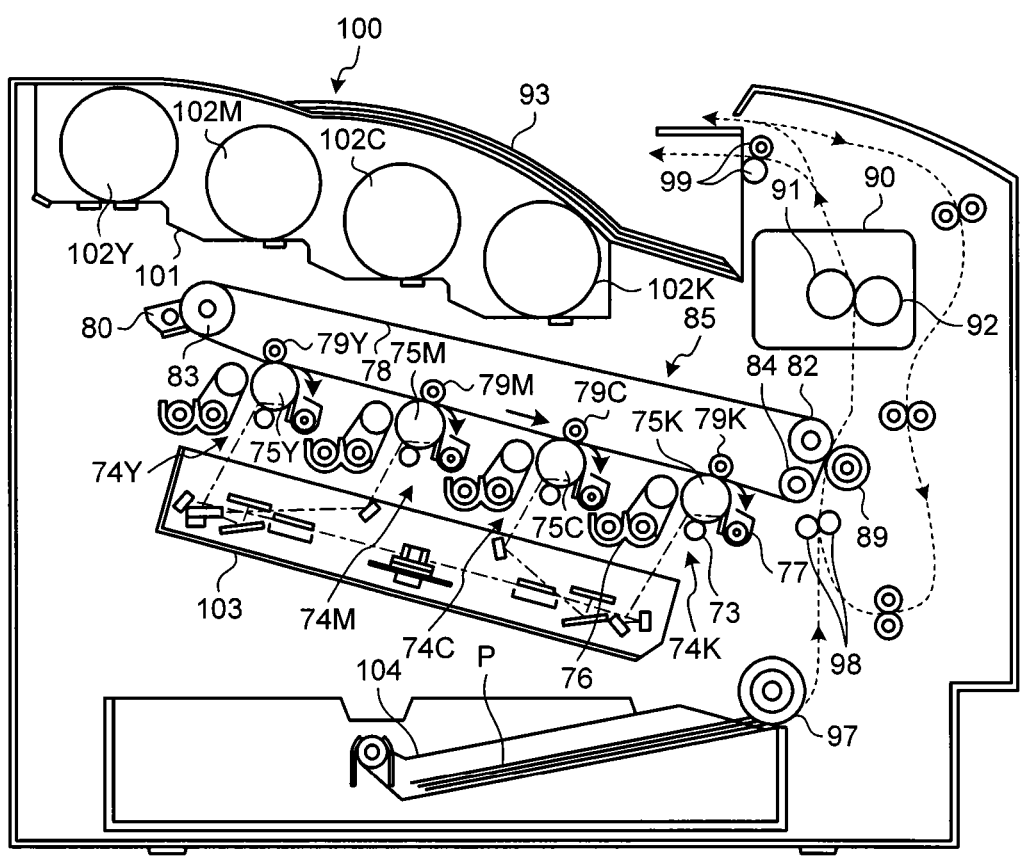
FIG. 11 is a diagram for illustrating an example of an image forming apparatus to which the motor control device according to the embodiment is applicable.

FIG. 11 illustrates an image forming apparatus 100 to which the motor control system 1 according to the embodiment is applicable. The image forming apparatus 100 illustrated in FIG. 11 is a tandem-type color printer. On a bottle housing unit 101 provided in the upper part of the main body of the image forming apparatus 100, four toner bottles 102Y, 102M, 102C, and 102K for respective colors (yellow, magenta, cyan, and black, respectively) are removably (replaceably) installed.

Below the bottle housing unit 101, an intermediate transfer unit 85 is provided, in which an intermediate transfer belt 78 is included. Image forming units 74Y, 74M, 74C, and 74K corresponding to respective colors (yellow, magenta, cyan, and black, respectively) are provided side by side, so as to face the intermediate transfer belt 78.

In the image forming units 74Y, 74M, 74C, and 74K, the photosensitive drums 75Y, 75M, 75C, and 75K are respectively provided. In the surrounding area of each of the photosensitive drums 75Y, 75M, 75C, and 75K, a charging unit 73, a developing unit 76, a cleaning unit 77, a neutralization unit (not illustrated) for the corresponding color are provided. At the photosensitive drums 75Y, 75M, 75O, and 75K, an image forming process (including a charging process, an exposing process, a developing process, a transfer process, and a cleaning process) is performed, whereby images of respective colors are formed on the photosensitive drums 75Y, 75M, 75C, and 75K.

The photosensitive drums 75Y, 75M, 75C, and 75K are driven to rotate by a not-illustrated drive motor clockwise as illustrated in FIG. 6. At the positions of the charging units 73, the surfaces of the photosensitive drums 75Y, 75M, 75C, and 75K are uniformly charged (the charging process).

After that, the surfaces of the photosensitive drums 75Y, 75M, 75C, and 75K reach the irradiation positions of laser light emitted from the exposing unit 103. Electrostatic latent images are formed by exposure scanning at the positions on the surfaces of the photosensitive drums 75Y, 75M, 75C, and 75K (the exposing process).

After that, the surfaces of the photosensitive drums 75Y, 75M, 75C, and 75K reach the respective positions facing the developing units 76. Electrostatic latent images are developed at the positions, whereby the toner images of respective colors are formed thereon (the developing process).

After that, the surfaces of the photosensitive drums 75Y, 75M, 75C, and 75K reach the respective positions facing the intermediate transfer belt 78 and first transfer bias rollers 79Y, 79M, 79C, and 79K. The toner images on the photosensitive drums 75Y, 75M, 75C, and 75K are transferred onto the intermediate transfer belt 78 at the positions (the primary transfer process). On this occasion, a small amount of not-transferred toner remains on the photosensitive drums 75Y, 75M, 75C, and 75K.

After that, the surfaces of the photosensitive drums 75Y, 75M, 75C, and 75K reach the respective positions facing the cleaning units 77. The not-transferred toner remaining on the photosensitive drums 75Y, 75M, 75C, and 75 is mechanically collected by a cleaning blade of the cleaning unit 77 (the cleaning process).

Finally, the surfaces of the photosensitive drums 75Y, 75M, 75C, and 75K reach the respective positions facing not-illustrated neutralization units. Residual electric potential on the photosensitive drums 75Y, 75M, 75C, and 75K is removed at the positions. This ends a series of image forming processes performed on the photosensitive drums 75Y, 75M, 75C, and 75K.

After that, the toner images of respective colors formed on the photosensitive drums through the developing process are transferred on the intermediate transfer belt 78 in a superimposed manner. As a result, color image is formed on the intermediate transfer belt 78.

The intermediate transfer unit 85 includes the intermediate transfer belt 78, the four primary transfer bias rollers 79Y, 79M, 79C, and 79K, a secondary transfer back-up roller 82, a cleaning back-up roller 83, a tension roller 84, and an intermediate transfer cleaning unit 80. The intermediate transfer belt 78 is stretched around and supported by the three rollers 82, 83, and 84, and is endlessly moved in the direction of the arrow illustrated in FIG. 6 by being driven to rotate by the roller 82.

The four primary transfer bias rollers 79Y, 79M, 79C, and 79K and the photosensitive drums 75Y, 75M, 75C, and 75K respectively sandwich the intermediate transfer belt 78, thereby forming primary transfer nips therebetween. Subsequently, a transfer bias with the polarity reverse to the polarity of the toner is applied to the primary transfer bias rollers 79Y, 79M, 79C, and 79K.

The intermediate transfer belt 78 then runs in the arrow direction and sequentially passes through the nips at the primary transfer bias rollers 79Y, 79M, 79C, and 79K. As a result, the toner images of respective colors on the photosensitive drums 75Y, 75M, 75C, and 75K are primarily transferred onto the intermediate transfer belt 78 in a superimposed manner.

After that, the intermediate transfer belt 78 onto which the toner images of respective colors have been primarily transferred reaches the position facing the secondary transfer roller 89. The secondary transfer back-up roller 82 and the secondary transfer roller 89 sandwich the intermediate transfer belt 78 at this position, thereby forming a secondary transfer nip therebetween. The four-color toner image formed on the intermediate transfer belt 78 is transferred onto a recording medium P conveyed to the position of the secondary transfer nip. On this occasion, toner remains on the intermediate transfer belt 78, which has not been transferred onto the recording medium P.

After that, the intermediate transfer belt 78 reaches the position of the intermediate transfer cleaning unit 80. The not-transferred toner remaining on the intermediate transfer belt 78 is mechanically collected by the cleaning blade of the cleaning unit 77. This ends a series of transfer processes performed on the intermediate transfer belt 78.

The recording medium P has been conveyed from a paper feeding unit 104 provided on the lower part of the image forming apparatus 100 through the paper feeding roller 97 or a pair of registration rollers 98 and then conveyed to the position of the secondary transfer nip.

More specifically, a plurality of recording media P such as transfer sheets are stored in a stacked manner in the paper feeding unit 104. When the paper feeding roller 97 is driven to rotate counterclockwise in FIG. 11, the top sheet of the recording media P stacked in the paper feeding unit 104 is fed toward the gap between a pair of registration rollers 98.

The recording medium P conveyed to the pair of registration rollers 98 temporarily stops at the position of the nip of the pair of registration rollers 98 because the pair of registration rollers 98 has stopped rotating. Subsequently, the pair of registration rollers 98 is driven to rotate synchronously with the color image on the intermediate transfer belt 78. In this way, the intended color image is transferred onto the recording medium P.

After that, the recording medium P, onto which the color image has been transferred at the position of the secondary transfer nip, is then conveyed to the position of a fixing unit 90. The color image transferred on the surface of the recording medium P is then fixed thereon by the heat and pressure generated between the fixing roller 91 and the pressing roller 92.

After that, the recording medium P is ejected to the outside of the apparatus through the gap between the pair of ejecting rollers 99. The transferred recording medium P ejected by the pair of ejecting rollers 99 to the outside of the apparatus is then sequentially stacked on a stacking unit 93 as an output image. This ends a series of image forming processes in an image forming apparatus 100.

The motor 30 controlled by the motor control system 1 according to the embodiment can be used as the power of a driving system for driving the above-described pair of registration rollers 98. For example, when the recording medium P is temporarily stopped at the position of the nip of the pair of registration rollers 98, the motor drive mode of the motor 30 is set to the position holding mode. By stopping the drive rotation of the motor 30 in the position holding mode, the rotational position of the motor 30, that is, the rotational position of the pair of registration rollers 98 is held, whereby the position of the recording medium P is held.

On this occasion, according to the embodiment, while the position of the recording medium P is held in the position holding state, the motor 30 is controlled to reverse the rotational direction for each driving period of the motor 30. The count value for detecting the lock state is therefore reset for each driving period of the motor 30, thus the count value does not exceed the threshold. As a result, although the stopped state of the recording medium P continues for a long time, an erroneous detection of the lock state can be avoided.

An application target of the motor 30 controlled by the motor control system 1 according to the embodiment is not limited to the driving source of the pair of registration rollers 98. The motor 30 may be applied to other power sources which needs drive control to hold the position, in the image forming apparatus 100.

The embodiment can provide the advantageous effect of avoiding an erroneous detection of a lock state of a motor actually in a position holding state.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor control device that supplies a drive control signal to a drive circuit that drives a motor at a constant period using a motor drive signal based on the drive control signal used to generate torque on the motor, and shuts off the motor drive signal to the motor when a count value counted by a counter that counts the count value at a predetermined interval and resets the count value if a state of the motor changes exceeds a threshold corresponding to the count value for a plurality of driving periods of the motor, the motor control device comprising:

a setting unit that sets a rotational direction of the motor driven under control at the constant period;

a control unit that controls the setting unit to set the rotational direction of the motor to a first rotational direction and a second rotational direction reverse to the first rotational direction at the constant period alternately, when a drive mode of the motor is a position holding mode to drive the motor so as to hold a rotational position of the motor; and a generating unit that generates the drive control signal.

2. The motor control device according to claim 1, wherein the control unit controls the generating unit to generate the drive control signal that makes torque in the second rotational direction smaller than torque in the first rotational direction set in advance, when the drive mode is the position holding mode.

3. The motor control device according to claim 1, wherein the motor is a brushless direct current (DC) motor.

4. An image forming apparatus comprising:

the motor control device according to claim 1; and an image forming unit that forms an image on a recording medium conveyed under drive of the motor driven by the motor control device.

5. A motor control method of supplying a drive control signal to a drive circuit that drives a motor at a constant period using a motor drive signal based on the drive control signal used to generate torque on the motor, and shuts off the motor drive signal to the motor when a count value counted by a counter that counts the count value at a predetermined interval and resets the count value if the state of the motor changes exceeds a threshold corresponding to the count value for a plurality of driving periods of the motor, the motor control method comprising:

setting a rotational direction of the motor driven under control at the constant period;

controlling the setting to set the rotational direction of the motor to a first rotational direction and a second rotational direction reverse to the first rotational direction at the constant period alternately, when a drive mode of the motor is a position holding mode to drive the motor so as to hold a rotational position of the motor; and generating the drive control signal.

\* \* \* \* \*